United States Patent

McMurtry et al.

[11] Patent Number: 5,345,690
[45] Date of Patent: Sep. 13, 1994

[54] CONTACT PROBES

[75] Inventors: David R. McMurtry, Wotton-Under-Edge; Gillies D. Pitt, Hewelsfield; Peter G. Lloyd, Bristol; David Wilson, Stonehouse, all of United Kingdom

[73] Assignee: Renishaw Metrology Limited, Gloucestershire, United Kingdom

[21] Appl. No.: 930,700

[22] PCT Filed: Feb. 24, 1992

[86] PCT No.: PCT/GB92/00330
§ 371 Date: Oct. 7, 1992
§ 102(e) Date: Oct. 7, 1992

[87] PCT Pub. No.: WO92/14987
PCT Pub. Date: Sep. 3, 1992

Related U.S. Application Data

[63] Continuation-in-part of Ser. No. 768,433, Sep. 26, 1991, abandoned.

[30] Foreign Application Priority Data

Feb. 23, 1990 [GB] United Kingdom ............... 9004117

[51] Int. Cl.5 .............................................. G01B 5/03
[52] U.S. Cl. ......................................... 33/561; 33/559; 33/558

[58] Field of Search ............... 33/556, 557, 558, 559, 33/560, 561

[56] References Cited

U.S. PATENT DOCUMENTS

| | | |
|---|---|---|
| 4,153,998 | 5/1979 | McMurtry . |
| 4,177,568 | 12/1979 | Werner et al. ..................... 33/561 |
| 4,462,162 | 7/1984 | McMurtry ........................ 33/561 |
| 4,702,013 | 10/1987 | McMurtry . |
| 4,734,994 | 4/1988 | Cusack ............................. 33/561 |
| 4,813,151 | 3/1989 | Hajdukiewicz et al. . |
| 4,859,817 | 8/1989 | Cassani ............................ 33/561 |

FOREIGN PATENT DOCUMENTS

| | | |
|---|---|---|
| 0157541 | 10/1985 | European Pat. Off. . |
| 0159781 | 10/1985 | European Pat. Off. . |
| 0204926 | 12/1986 | European Pat. Off. . |
| WO89/09927 | 10/1989 | PCT Int'l Appl. . |
| WO90/12998 | 11/1990 | PCT Int'l Appl. . |

*Primary Examiner*—Thomas B. Will
*Attorney, Agent, or Firm*—Oliff & Berridge

[57] ABSTRACT

A touch trigger probe includes a hybrid integrated circuit (58). On this circuit are provided both kinematic support elements (28) for supporting a deflectable stylus (14) in a precise rest position, and sensing elements (40) for detecting contact between the stylus (14) and a workpiece. Embodiments are also disclosed in which the kinematic support elements are provided on a silicon chip, e.g. by micro-machining.

16 Claims, 4 Drawing Sheets

CONTACT PROBES

This is a continuation-in-part of application Ser. No. 07/768,433, filed Sep. 26, 1991, now abandoned.

FIELD OF THE INVENTION

This invention relates to contact probes for use on position determining apparatus such as coordinate measuring machines, measuring robots or machine tools.

DESCRIPTION OF PRIOR ART

One type of contact probe is known as a touch-trigger probe. Such a probe has a workpiece-contacting stylus extending from a housing. The stylus is supported in a rest position by support elements within the housing, and is urged into the rest position by a bias means such as a spring, so as to be deflectable out of the rest position when the stylus contacts a workpiece. The probe also contains means for detecting when the stylus contacts the workpiece, to produce a trigger signal. In use, the machine into which the probe is mounted moves the probe relative to the workpiece. When the trigger signal is generated, the machine reads the instantaneous X,Y,Z coordinates of the probe. By repeating this process at various points of contact on the workpiece surface, it is possible to make very precise measurements of the dimensions of features of the workpiece. It is also known to support the stylus via such support elements in analogue or measuring probes, in which a transducer measures the amount of stylus deflection.

Usually, the support elements are arranged so as to form a kinetic support, e.g. as described in U.S. Pat. No. 4,153,998 (McMurtry), which ensures that the rest position of the stylus is very precisely defined. In that patent, the contact with the workpiece is detected and the trigger signal produced by the breaking of electrical contact between the kinematic support elements. However, in recent years probes have been produced which can generate the trigger signal more quickly at the instant of contact, for example by using strain gauges to detect the minute amounts of strain produced in components of the probe when the stylus starts to be deflected by the workpiece; or piezoelectric elements which can detect either such strain or a shock wave generated by the contact between the stylus tip and the workpiece. Examples are shown in U.S. Pat. No. 4,462,162 (McMurtry), No. 4,813,151 (Hajdukiewicz et al), No. 4,702,013 (McMurtry) and No. 4,177,568 (Zeiss). It is also known to use other detection means such as photoelectric sensors and capacitance sensors. A probe for a programmable manipulator, using semiconductor capacitance sensors, is shown in European Patent Application No. EP-159781-A (EMI).

However, such probes are complex to assemble and therefore expensive.

SUMMARY OF THE INVENTION

Preferred embodiments of the present invention make use of the techniques developed for the manufacture of integrated circuits, and provide the stylus support elements of a probe on such a circuit. Such circuits may be mass produced at relatively low cost, and assembling them into probes can be less complex (and therefore cheaper) than existing stylus support mechanisms.

The present invention provides a contact probe for use on position determining apparatus, comprising:

a relatively fixed member for attachment to the apparatus;

a relatively movable member for carrying a workpiece-contacting stylus;

mutually engageable support elements on the fixed member and the movable member respectively, for supporting the movable member on the fixed member;

bias means for biasing said engageable elements into engagement, the movable member being deflectable against the action of the bias means;

a sensing element for providing an output signal when the stylus is in contact with a workpiece; and an integrated circuit or circuit board within the probe, at least one of said support elements being integrated onto the integrated circuit or circuit board.

Preferably said sensing element is also integrated onto the integrated circuit. Other circuitry associated with the sensing element may also be integrated onto the integrated circuit, e.g. for processing the signals produced by the sensing element or for temperature compensation.

The integrated circuit may be either a monolithic or hybrid integrated circuit. Alternatively, a printed circuit board may be used, either of the conventional or surface-mount type.

BRIEF DESCRIPTION OF THE DRAWINGS

Preferred embodiments of the present invention will now be described by way of example, with reference to the accompanying drawings, wherein.

DESCRIPTION OF PREFERRED EMBODIMENTS

Figure 1:
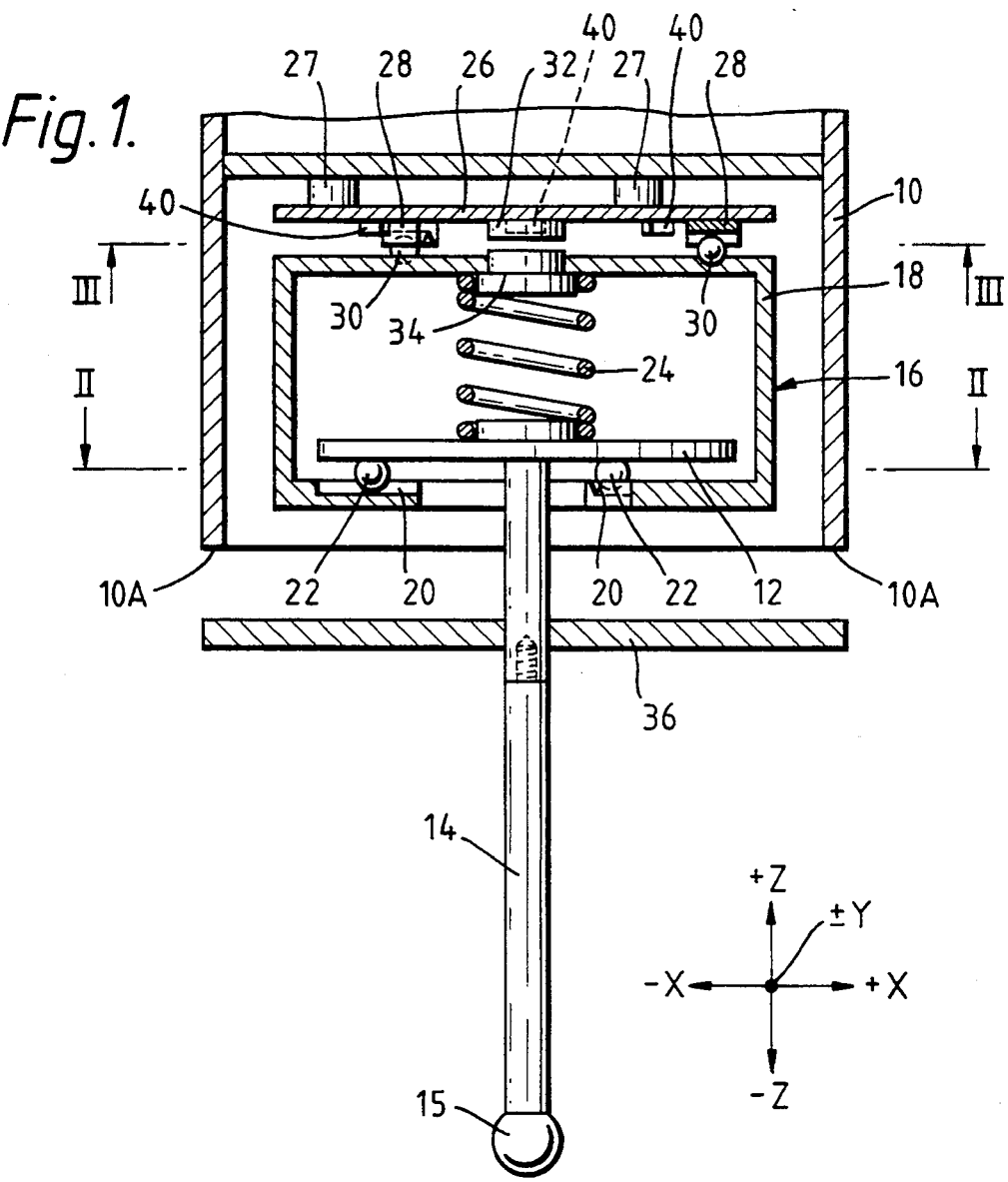
FIG. 1 is a vertical cross-section through a first probe according to the invention.

Referring firstly to FIG. 1, the first probe embodiment comprises a fixed member in the form of a housing 10, and a stylus holding member 12. The housing 10 can be attached to position determining apparatus such as a coordinate measuring machine, measuring robot or machine tool, which can then move the probe relative to a workpiece to be measured. A stylus 14 extends from the housing 10 and is attachable to the stylus holding member 12, and has a workpiece-contacting tip 15. The stylus holding member 12 is located within a module 16 within the housing 10, and the module 16 provides for the necessary overtravel when the stylus 14 is deflected by contacting a workpiece, in any horizontal direction, ±X, ±Y, and in the vertical direction +Z.

Figure 2:
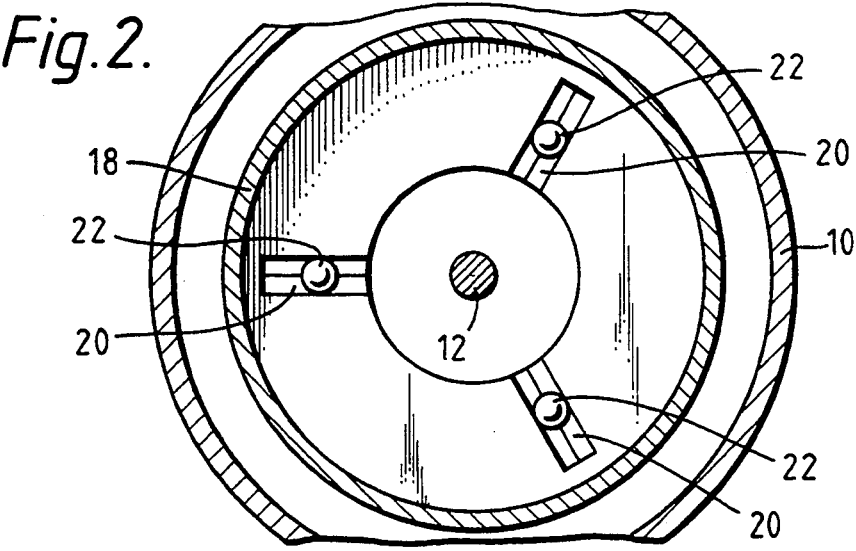
FIG. 2 is a horizontal cross-section on the line II—II in FIG. 1.

The module 16 comprises a relatively fixed part 18, within which the stylus holding member 12 is located in a rest position on a kinematic mount. A kinematic mount provides a very precisely defined rest position, as is well known. Various forms of kinematic mount are known in the art, and may be used. For example, some forms are described in U.S. Pat. No. 4,153,998. In the present embodiment, as seen in FIGS. 1 and 2, the kinematic mount comprises three radially-extending V-grooves 20 in the relatively fixed module part 18. These grooves are open in the upwards direction, and are spaced at 120° apart from each other around the vertical axis of the probe. The underside of the stylus holding member 12 has three corresponding balls 22 affixed thereto. The balls 22 are biased into their respective V-grooves 20 by a compression spring 24 acting between the stylus holding member 12 and the part 18.

In normal use of the probe, when the stylus tip 15 contacts the workpiece in any horizontal direction, the stylus 14 and the stylus holding member 12 tilt about at least one of the balls 22, and one or two of the other balls disengage from their respective V-grooves 20. This provides for the necessary overtravel of the probe without causing damage in normal circumstances. Likewise, the stylus 14 and stylus holding member 12 can be deflected bodily upwards (in the +Z direction) when the probe is brought vertically downwards onto a workpiece. In this case, all the balls 22 disengage from their respective V-grooves 20. When the probe is again moved so that the stylus no longer contacts the workpiece, the stylus holding member 12 is returned to its original precisely defined rest position within the module 16 under the action of the bias provided by the spring 24.

The module 16 is mounted to a hybrid integrated circuit 26 within the housing 10. The circuit 26 is seen in both FIGS. 1 and 3. It contains appropriately sensitive sensors and may also if desired carry electronic circuits which are associated with the sensors, e.g. to develop a trigger signal each time the stylus tip 15 contacts a workpiece. Suitably, the sensors are sensitive to minute strains or deformations which are transmitted through the module 16 and the circuit 26 to the fixed housing member 10 whenever such contact occurs, and the trigger signal is generated whenever the outputs of such strain sensors exceed a predetermined trigger threshold.

The mounting between the module 16 and the circuit 26 takes the form of another kinematic mount, so that the module itself can move bodily with respect to the housing 10. Again, any of the well known forms of kinematic mount may be used, but in the example shown here three metal support elements 28 having radially-extending V-grooves are provided on the underside of the circuit 26, spaced at 120° intervals around the axis of the probe. Balls 30 are fixed to the upper side of the module 16 and locate in respective ones of the V-groove elements 28. This ensures that the module 16 has a precisely defined rest position relative to the housing 10, and together with the kinematic mount of the stylus holding member 12 within the module 16, the precisely defined rest position of the stylus 14 relative to the housing 10 is assured. The balls 30 are biased into the V-grooves 28 by means of a permanent magnet 32 provided on the integrated circuit 26, which attracts a soft iron striker plate 34 on the upper surface of the module 16. However, it will be appreciated that other bias means may be provided, e.g. a tension spring.

Figure 3:
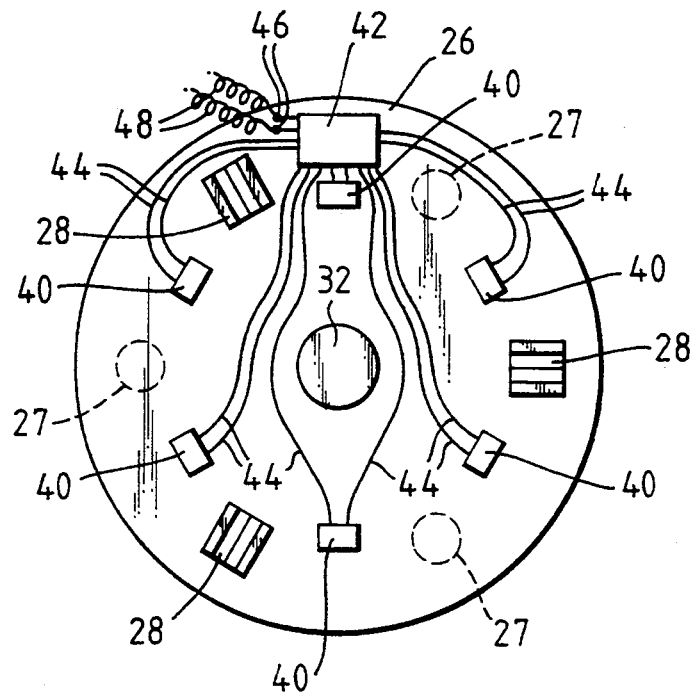
FIG. 3 is a view of an integrated circuit, on the line III—III in FIG. 1.

The hybrid integrated circuit 26 has a ceramic substrate, to which the V-groove support elements 28 are bonded. As shown in FIG. 3 a plurality of semiconductor strain gauge elements 40 are also bonded to the substrate, and are positioned to respond to strains generated in the substrate when the stylus contacts a workpiece. Preferably there should be at least three strain gauge elements 40, positioned so as to respond to stylus deflections in any direction. The present example shows six strain gauge elements 40 which may be connected in differential pairs. The magnet 32 is similarly bonded to the substrate 26. Finally, an electronic circuit 42 for processing the outputs of the strain gauges 40 is also bonded to the substrate 26. The electronic circuit 42 may be an application specific monolithic integrated circuit. Interconnections 44 between the strain gauges 40 and the circuit 42 are provided in any conventional manner known in hybrid integrated circuit technology, such as silk screen printing. The monolithic circuit 42 is provided with output electrode pads 46 by the same method, for attachment of external leads 48. The various components 40,42 may be electrically connected to the interconnections 44 directly, by bonding them to the substrate 26 with appropriately arranged conductive epoxy resin. Alternatively, the interconnections 44 may terminate in electrode pads for conventional wire bonding to the components 40,42. FIG. 3 shows the components 40,42 on the same side of the substrate as the support elements 28, but if desired some or all of them may be mounted on the opposite side of the substrate.

In the circuit of FIG. 3, it is possible to mount one or more reference resistances (which may be a strain gauge mounted in a position where strain will not be experienced, such as on the opposite side of the substrate to one of the pillars 27). Such a reference resistance may be used in circuits similar to that disclosed in our co-pending U.K. Patent Application No. 9116245.3 which corresponds to U.S. patent application No. 07/915,138 now U.S. Pat. No. 5,295,307, in order to compensate for temperature drift of the strain gauges. The circuit 42 may contain signal processing circuits such as disclosed in our co-pending U.K. Patent Applications Nos. 9114371.9 and 9114353.7 both of which corresponds to U.S. patent application No. 07/907,128, now U.S. Pat. No. 5,228,352.

If desired, it is possible to provide electrical switching through the convergent surfaces of the V-grooves 28, in order to detect stylus deflection in the same manner as described in U.S. Pat. No. 4,153,998, as well as or instead of the strain gauges 40. Then the support elements 28 may be made up of two conductive halves, one for each side of the V-groove. Connections to these two conductive halves may then be made using interconnections 44 in the same manner as described above.

The stylus holding member 12 (FIG. 1) is provided with a horizontally extending flange 36. When the stylus 14 is in its rest position, this flange 36 is located under a bottom annular edge 10A of the housing 10, spaced apart from the edge 10A by a gap. This gap is of sufficient size so that the flange 36 does not interfere with the normal operation of the probe described above. However, the flange 36 is useful should a collision accidentally arise in which the movement of the probe is not braked when the stylus 14 hits a workpiece as the probe travels towards that workpiece, e.g. because of faulty programming of a computer which controls the movement of the probe. In such a collision, the flange 36 acts to protect the fragile circuit 26 and the sensitive components located on it.

Where such a collision occurs while the probe is travelling horizontally, at first the stylus holding member 12 tilts as described above. During this normal tilting, the spring 24 gives way and limits the loading on the plate 26. When the tilting becomes excessive, the flange 36 touches the bottom edge 10A of the housing 10 at one point, and loading then occurs directly between the flange 36 and the housing 10. As the probe overtravels further, the entire module 16 starts to tilt about one or two of the balls 30, and the other ball or balls 30 disengage from their respective V-grooves 28. As such excessive tilting continues, the striker plate 34 moves away from the magnet 32, so that the magnet 32 is no longer able to hold the module 16 in place. The module 16 and the attached stylus 14 then simply fall out of the housing 10, and damage to the relatively fragile circuit 26 is avoided.

If the collision with the workpiece occurs vertically, in the +Z direction, then as described above the stylus holding member 12 lifts bodily within the module 16. Again, the stress on the circuit 26 is limited by the spring 24. When the overtravel becomes excessive, the flange 36 again contacts the bottom edge 10A of the housing. In this case, tilting of the module 16 is not possible but nevertheless all the loading is taken between the flange 36 and the housing 10, and excessive loading of the circuit 26 is avoided. Inevitably, the stylus 14 will be damaged, but this is a cheap, easily replaceable item when compared with the circuit 26.

If desired, the module 16 may be replaced by the deflectable suspension and the measuring elements of a conventional analogue probe, instead of the kinematic mechanism 20,22 described above. There may then be no need for the components 40,42 on the hybrid integrated circuit 26, and just the support elements 28 may be bonded to it using hybrid techniques. Alternatively, the suspension and measuring elements of an analogue probe may be provided above the hybrid circuit 26, between the circuit 26 and the housing 10. The module 16 then provides an exchangeable stylus unit for the analogue probe.

Figure 4:
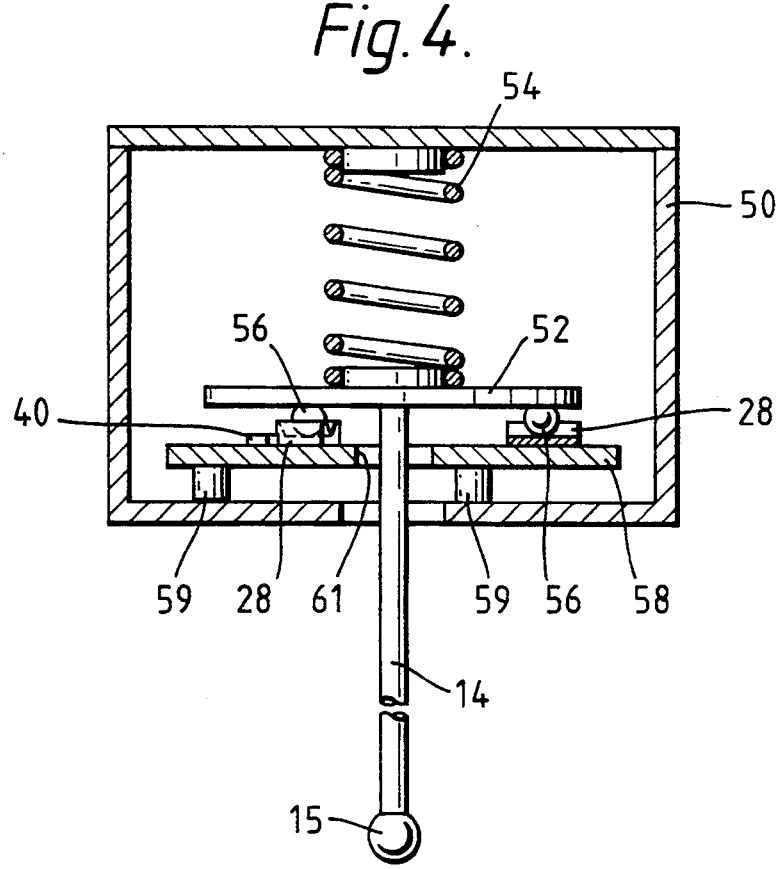
FIG. 4 is a vertical cross-section through a second probe according to the invention.

FIG. 4 shows an alternative probe arrangement, having a housing 50, within which is provided a stylus-holding member 52. This carries a stylus 14 with a tip 15, similar to FIG. 1. Attached to the underside of the stylus-holding member 52 are three balls 56, spaced at 120° intervals. A hybrid integrated circuit 58 is similar to the circuit 26 of FIGS. 1 and 3, and is mounted on pillars 59. However, an aperture 61 is provided in the centre of the circuit, in place of the magnet 32, so that the stylus 14 may pass through the aperture. A spring 54 biases the balls 56 into V-groove support elements 28, which are provided on the circuit 58 in the same manner at FIGS. 1 and 3. Strain gauges 40 and other circuit-elements are also provided on the circuit 58 in the same manner as shown in FIG. 3.

As already mentioned, the circuits 26,58 of FIGS. 1,3 and 4 are preferably hybrid integrated circuits. This means that the circuit elements 40,42 are bonded directly to the substrate in an unencapsulated form, thus saving space. However, it is also possible to form the circuits 26,58 as printed circuit boards, upon which are mounted components in encapsulated form. The printed circuit board may be of the conventional type, having holes into which the encapsulated components may be soldered, or it may be of the surface mount type.

Figure 5:
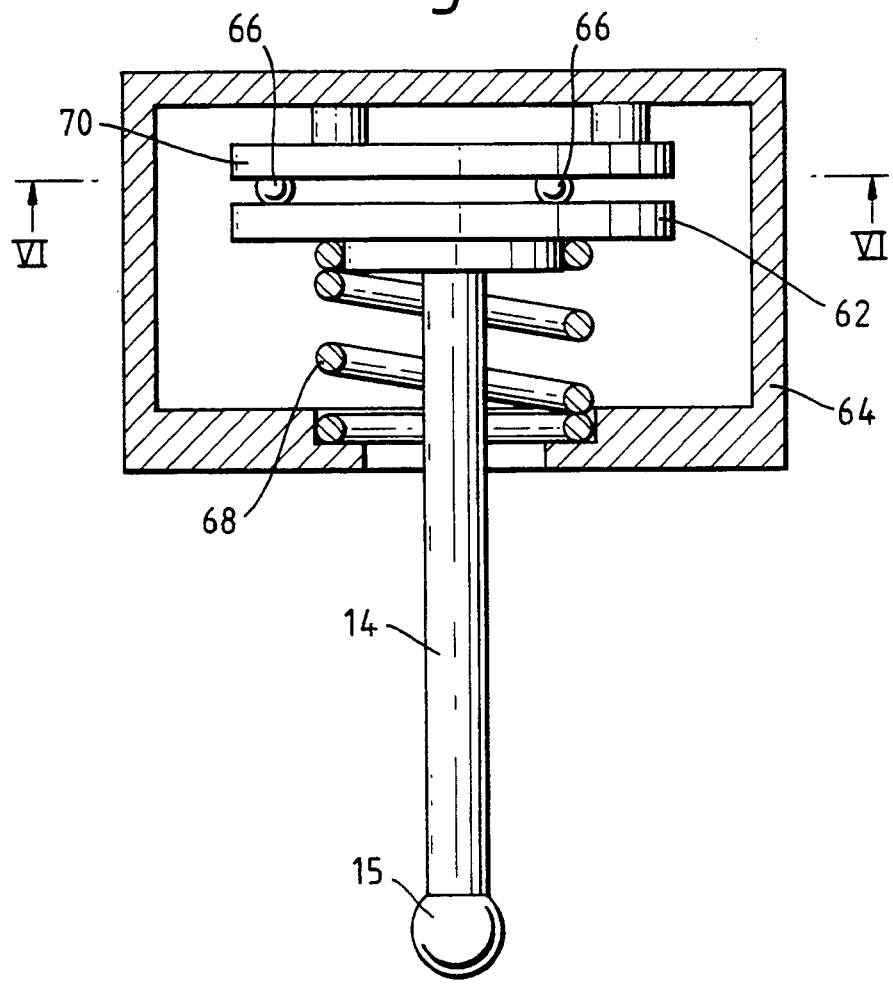
FIG. 5 is a vertical cross-section through a third probe according to the invention.
Figure 6:
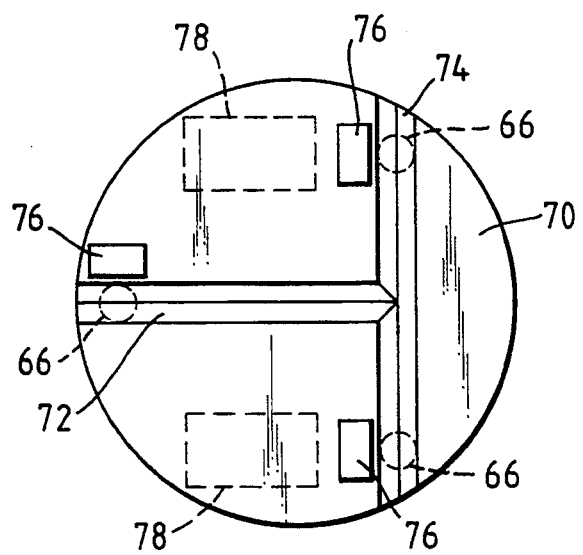
FIG. 6 is a view of an integrated circuit, on the line VI—VI in FIG. 5.

FIGS. 5 and 6 show another probe example, having a stylus-holding member 62 within the housing 64. As before, a stylus 14 having a workpiece-contacting tip 15 is fixed to the stylus-holding member 62. Three balls 66 are fixed at 120° intervals on the upper surface of the stylus-holding member 62. A spring 68 urges the stylus-holder 62 upwards, so that the balls 66 engage a monolithic silicon chip 70, which is fixed to the housing 64.

As seen in FIG. 6, the silicon chip 70 is micro-machined with V-grooves 72,74, into which the balls 66 engage. The micro-machining can be carried out using any conventional process, such as wet chemical etching, plasma etching, etc. The V-grooves can easily be formed by anisotropically etching the silicon material, making use of the fact that certain reagents will etch different crystallographic planes at significantly different rates. This enables the sloping sides of the V-grooves to be formed as desired. However, it is not possible using such a method to produce on a single chip three radial V-grooves aligned at 120° to each other. Therefore, FIG. 6 shows that two grooves 72,74 are formed at 90° to each other, in a T-shape. The groove 74 engages two of the balls 66, at the positions shown by broken lines in FIG. 6, whereas the groove 72 engages the third ball.

On the same silicon chip 70, using conventional monolithic integrated circuit manufacturing techniques, three or more strain gauges 76 are formed by diffusing suitable dopants into the semiconductor substrate. Alternatively, these strain gauges may be formed by ion implantation techniques. The strain gauges 76 are positioned so as to sense the changes of strain which are produced in the silicon substrate 70 when the stylus tip 15 contacts a workpiece. Signal processing circuitry for processing the signals from the strain gauges 76 may also be integrated onto the silicon chip 70, e.g. in areas indicated generally at 78. The requisite interconnections between the various circuit elements and strain gauges are formed in an entirely conventional manner by a metallisation layer, etched to a suitable pattern by photolithography.

If desired, a single silicon chip 70 as described above may be used in place of the hybrid integrated circuits 26,58 in FIGS. 1 and 4. In the case of FIG. 4, a central aperture corresponding to the aperture 61 may be formed by drilling or micro-machining the silicon substrate. Another possibility is to replace each of the support elements 28 on the hybrid circuit with an individual silicon chip, having a micro-machined V-groove, and optionally also having one or more strain sensors on the chip. Of course, other semiconductors may be used instead of silicon.

Figure 7:
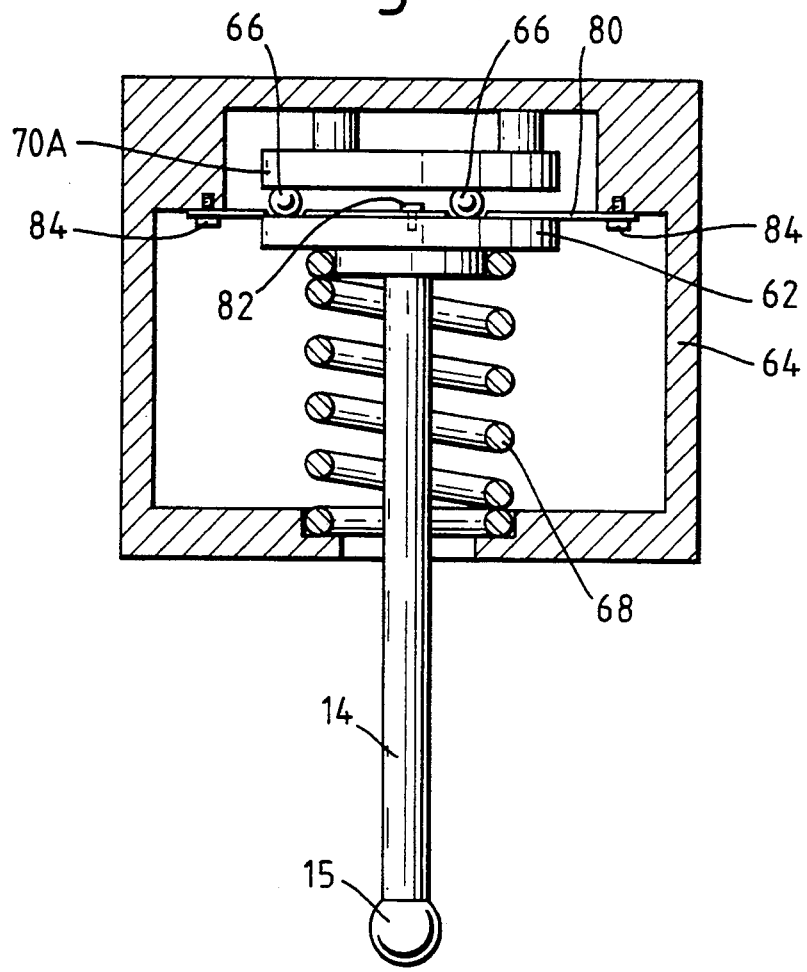
FIG. 7 is a vertical cross-section through a fourth probe according to the invention.

FIG. 7 shows another form of a probe according to the invention. It is similar to that of FIG. 5, and the same reference numerals have been used to denote similar parts where appropriate. However, in place of the chip 70 there is provided a chip 70A, without the V-grooves 72,74 for engaging the balls 66. Instead, each ball 66 engages a flat surface on the chip 70A, as described below. A planar spring 80 is attached at a central region 82 to the stylus-holding member 62, and at peripheral regions 84 to the housing 64. This constrains the stylus-holding member 62 against lateral movement, and in combination with the three point contact provided by the three balls 66 achieves a kinematic support. The planar spring 80 may be provided with appropriate cut-outs to accommodate the balls 66 and to provide axial flexibility for the movement of the stylus-holding member 62.

Figure 8:
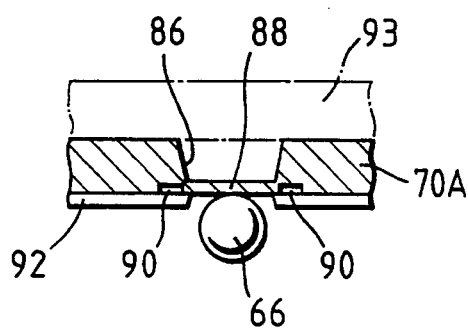
FIG. 8 is a cross-section through the integrated circuit, in FIG. 7.

As seen in FIG. 8, each ball 66 engages a flat surface opposite the bottom of a respective well 86 which is micro-machined by etching the silicon substrate 70A. Each well 86 is relatively deep, leaving a thin diaphragm 88 of silicon material which is very easily strained by the contact force of the ball 66. Strain gauges are formed in or adjacent this silicon diaphragm 88, e.g. by diffusing or ion implanting suitable dopants in regions 90. Electrical connections are made to these regions 90 by a metallisation layer 92, patterned as desired by conventional photolithographic etching techniques. As with the silicon chip 70 of FIG. 6, other appropriate electronic circuitry may be integrated onto the silicon chip 70A as desired. If required for strength, the silicon substrate 70A may be fixed to a further substrate 93, e.g. of glass, quartz or ceramic. It is also possible, if desired, to mount the chip 70A the other way up, so that the ball 66 engages the flat surface at the bottom of the well. 86.

Figure 9:
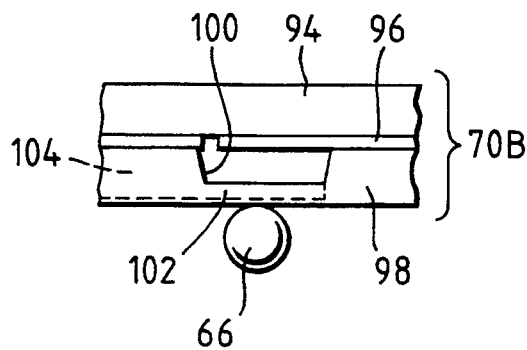
FIG. 9 is a similar view to FIG. 8, but shows an alternative integrated circuit.

FIG. 9 shows an alternative to silicon strain gauges for use as a sensor in the probe of FIG. 7. In place of the monolithic chip 70A a hybrid sensor 70B is provided. This comprises a substrate 94 of glass, quartz or ceramic. On one surface of the substrate 94 there is provided a metallisation layer 96, in which a desired pattern has been formed by photolithographic etching techniques. A well 100 is etched in a silicon chip 98, leaving a diaphragm 102 in the same manner as in FIG. 8. Prior to the formation of the well 100, the silicon chip 98 is selectively doped in a region 104 with a suitable dopant to render the silicon conductive. To make the hybrid sensor 70B, the chip 98 and the substrate 94 are bonded to each other.

The conductive region 104 extends across the diaphragm 102 and forms one plate of a capacitor. The other plate of the capacitor is formed by the metallisation layer 96. When the diaphragm 102 bears against the ball 66, it is deformed, and this alters the capacitance value of the capacitor thus formed. Changes in this capacitance are readily detected by appropriate electronic circuitry, and thus contact with the workpiece by the stylus 14 can be detected. Obviously, three of the structures shown in FIG. 9 are required in a probe of the type shown in FIG. 7. It is possible for three wells 100 and diaphragms 102 to be formed in one silicon chip, at appropriate 120° spacings. The detection circuitry for detecting capacitance changes may then also be integrated on the same silicon chip. It will be appreciated that in this case, the hybrid circuit 70B is made up of the substrate 94 and chip 98 which are of similar sizes to each other. Alternatively, however, each of the required three wells 100 and diaphragms 102 may be constructed on an individual silicon chip, bonded to a larger substrate 94 at appropriate positions. Any additional circuitry is then also bonded to the substrate 94 and interconnected as required, in a similar manner to that of FIG. 3.

It is possible to grow a microcrystalline diamond film directly on the semiconductor surfaces, in any of the above embodiments where balls are to bear directly on the surface of the semiconductor chip. This diamond film can be smoothed by a mixture of photolithography and ion beam (plasma) polishing. This provides a good surface for location of the balls. Silicon nitride ($Si_3N_4$) may be used in place of diamond. By further ion beam bombardment, parts of the diamond film could be made conducting as required, permitting electrical switching between the ball and the chip surface for detection of stylus displacement in the manner of U.S. Pat. No. 4,153,998.

Of course, the present invention is not limited to integrated circuits made from the materials described, and many other materials which can be formed using integrated circuit technology could be used.

Neither is the invention limited to the particular sensors described. The strain gauge, capacitance or switching sensors could be replaced by any other sensors, such as photoelectric sensors or piezo sensors, preferably integrated onto the hybrid or monolithic integrated circuit.

We claim:

1. A contact probe for use on position determining apparatus, comprising:
   a relatively fixed member for attachment to the apparatus;
   a relatively movable member for carrying a workpiece-contacting stylus;
   mutually engageable support elements on the fixed member and the movable member respectively, for supporting the movable member on the fixed member;
   bias means for biasing said engageable elements into engagement, the movable member being deflectable against the action of the bias means;
   a sensing element for providing an output signal when the stylus is in contact with a workpiece; and
   an integrated circuit within the probe, at least one of said support elements being integrated onto the integrated circuit.

2. A contact probe according to claim 1 wherein said integrated circuit is a hybrid integrated circuit.

3. A contact probe according to claim 1 wherein said integrated circuit is a monolithic integrated circuit.

4. A contact probe according to claim 1 wherein said sensing element is integrated onto said integrated circuit.

5. A contact probe according to claim 1 wherein further circuitry associated with the sensing element is integrated onto said integrated circuit.

6. A contact probe for use on position determining apparatus, comprising:
   a relatively fixed member for attachment to the apparatus;
   a relatively movable member for carrying a workpiece-contacting stylus;
   mutually engageable support elements on the fixed member and the movable member respectively, for supporting the movable member on the fixed member;
   bias means for biasing said engageable elements into engagement, the movable member being deflectable against the action of the bias means; and
   a sensing element for providing an output signal when the stylus is in contact with a workpiece;
   wherein at least one of said support elements is formed of semiconductor material.

7. A contact probe according to claim 6 wherein said at least one support element formed of semiconductor material includes a recess micromachined in the semiconductor material.

8. A contact probe according to claim 6 wherein said sensing element is also provided in the semiconductor material.

9. A contact probe according to claim 6 wherein said at least one support element formed of semiconductor material is provided in an integrated circuit.

10. A contact probe according to claim 9 wherein said integrated circuit is a hybrid integrated circuit.

11. A contact probe according to claim 9 wherein said integrated circuit is a monolithic integrated circuit.

12. A contact probe according to claim 9 wherein said sensing element is integrated onto said integrated circuit.

13. A contact probe according to claim 9 wherein further circuitry associated with the sensing element is integrated onto said integrated circuit.

14. A contact probe according to claim 6 wherein said at least one support element formed of semiconductor material is provided on a printed circuit board.

15. A contact probe according to claim 14 wherein said sensing element is provided on said printed circuit board.

16. A contact probe according to claim 14 wherein further circuitry associated with the sensing element is provided on said printed circuit board.

* * * * *